US012607038B2

(12) United States Patent
Gugerli et al.

(10) Patent No.: US 12,607,038 B2
(45) Date of Patent: Apr. 21, 2026

(54) KEY ELEMENT, LOCK CYLINDER, LOCKING SYSTEM, AND METHOD

(71) Applicant: DORMAKABA SCHWEIZ AG, Wetzikon (CH)

(72) Inventors: Benjamin Gugerli, Wetzikon (CH); Christian Raimann, Wetzikon (CH); Markus Kornhofer, Herzogenburg (AT)

(73) Assignee: DORMAKABA SCHWEIZ AG, Kempten (CH)

( * ) Notice: Subject to any disclaimer, the term of this patent is extended or adjusted under 35 U.S.C. 154(b) by 14 days.

(21) Appl. No.: 18/855,179

(22) PCT Filed: Feb. 28, 2023

(86) PCT No.: PCT/EP2023/055031
§ 371 (c)(1),
(2) Date: Oct. 8, 2024

(87) PCT Pub. No.: WO2023/198351
PCT Pub. Date: Oct. 19, 2023

(65) Prior Publication Data

US 2025/0263950 A1 Aug. 21, 2025

(30) Foreign Application Priority Data

Apr. 14, 2022 (CH) ............................... 000446/2022

(51) Int. Cl.
*E05B 27/00* (2006.01)
*E05B 19/00* (2006.01)
*E05B 27/10* (2006.01)

(52) U.S. Cl.
CPC ...... *E05B 27/0042* (2013.01); *E05B 19/0023* (2013.01); *E05B 27/0017* (2013.01); *E05B 27/10* (2021.08)

(58) Field of Classification Search
CPC ............. E05B 19/0023; E05B 19/0035; E05B 19/0064; E05B 19/0017; E05B 19/0052;
(Continued)

(56) References Cited

U.S. PATENT DOCUMENTS 1,141,215 A * 6/1915 Sohm ...................... E05B 27/08 70/491
4,608,842 A * 9/1986 Tietz ................... E05B 19/0017 70/378
(Continued)

FOREIGN PATENT DOCUMENTS

CH 716812 A1 * 5/2021 ............... B23C 3/35
CH 716813 A1 * 5/2021 ............... B23C 3/35
(Continued)

OTHER PUBLICATIONS

International Search Report for Application No. PCT/EP2023/055031, dated May 30, 2023, 3 pages.
(Continued)

*Primary Examiner* — Steven A Tullia
(74) *Attorney, Agent, or Firm* — CANTOR COLBURN LLP

(57) ABSTRACT

A key element having a flat key with a key head and a key shank which extends along a key axis from the key head to a front key tip and has two parallel flat sides and two mutually opposing narrow sides. On at least one of the flat sides, an inlet groove extending from the key tip in parallel with the key axis is provided which has a non-constant depth along its axial extent. The inlet groove can have a first depth, in particular in an entry region, and a second, greater depth in a coding region remote from the key tip. The inlet groove is undercut, as a result of which an expanded sensing head of a block tumbler can engage therein.

20 Claims, 6 Drawing Sheets

(58) Field of Classification Search
CPC ............. E05B 19/0047; E05B 19/0058; E05B 27/0042; E05B 27/0017; E05B 27/10; E05B 27/0057; E05B 27/0096; E05B 27/02; E05B 27/0078; Y10T 70/7605; Y10T 70/7881
USPC .......... 70/491, 393, 402, 409, 358, 493, 419
See application file for complete search history.

(56) References Cited

U.S. PATENT DOCUMENTS

| | | | | | |
|---|---|---|---|---|---|
| 5,485,735 | A * | 1/1996 | Laabs | E05B 27/00 70/358 |
| 5,520,035 | A * | 5/1996 | Eizen | E05B 35/003 70/358 |
| 5,533,369 | A * | 7/1996 | Valdajos-Gallego | E05B 35/003 70/358 |
| 5,819,566 | A * | 10/1998 | Eden, Jr. | E05B 27/0078 70/358 |
| 6,058,750 | A * | 5/2000 | Li | E05B 27/0032 70/358 |
| 6,973,814 | B2 * | 12/2005 | Keller | E05B 35/10 70/491 |
| 6,983,630 | B2 * | 1/2006 | Eden, Jr. | E05B 27/0042 70/358 |
| 7,370,503 | B2 * | 5/2008 | Keller | E05B 27/0053 70/491 |
| 8,387,425 | B2 * | 3/2013 | Ben-Aharon | E05B 19/00 70/411 |
| 8,919,160 | B2 * | 12/2014 | Piotrowski | E05B 19/0029 407/56 |
| 9,771,738 | B2 * | 9/2017 | Field | E05B 27/0039 |
| 10,487,540 | B2 * | 11/2019 | Serafini | E05B 27/005 |
| 11,220,841 | B2 * | 1/2022 | Fenini | E05B 35/003 |
| 11,613,909 | B1 * | 3/2023 | Widén | E05B 27/0042 70/493 |
| 2009/0272161 | A1 * | 11/2009 | Talamonti | E05B 19/0017 70/491 |
| 2011/0302972 | A1 * | 12/2011 | Higuchi | E05B 29/00 70/491 |

FOREIGN PATENT DOCUMENTS

| | | | | | |
|---|---|---|---|---|---|
| DE | 627773 | C * | 3/1936 | E05B 27/00 |
| DE | 3225952 | A1 | 1/1984 | |
| DE | 3314511 | A1 * | 10/1984 | E05B 19/0017 |
| DE | 29708308 | U1 | 8/1997 | |
| DE | 102005024003 | B4 * | 2/2007 | E05B 27/0017 |
| EP | 2700775 | A2 | 2/2014 | |
| EP | 2803793 | A2 | 11/2014 | |
| EP | 3015628 | A1 * | 5/2016 | E05B 29/0033 |
| EP | 2890856 | B1 * | 4/2017 | E05B 27/0017 |
| ES | 2331394 | A1 * | 12/2009 | E05B 19/0023 |
| ES | 2368543 | A1 * | 11/2011 | E05B 19/0035 |
| ES | 2685954 | T3 * | 10/2018 | E05B 19/0017 |
| ES | 2773481 | T3 * | 7/2020 | E05B 27/0082 |
| ES | 2858501 | T3 * | 9/2021 | E05B 19/0017 |
| GB | 2078843 | A * | 1/1982 | E05B 19/0023 |
| GB | 2230555 | A * | 10/1990 | E05B 27/0035 |
| JP | 2004143750 | A * | 5/2004 | E05B 27/10 |
| JP | 2006104928 | A * | 4/2006 | E05B 27/10 |
| NL | 9002734 | A * | 7/1991 | E05B 27/00 |
| WO | WO-0120111 | A1 * | 3/2001 | E05B 19/00 |
| WO | 0177466 | A1 | 10/2001 | |
| WO | WO-2008071389 | A1 * | 6/2008 | E05B 15/08 |
| WO | 2014032191 | A1 | 3/2014 | |
| WO | WO-2014091488 | A1 * | 6/2014 | E05B 27/0021 |
| WO | WO-2016078900 | A1 * | 5/2016 | E05B 47/0044 |
| WO | WO-2017153557 | A1 * | 9/2017 | E05B 27/0017 |
| WO | WO-2021213839 | A1 * | 10/2021 | E05B 27/0078 |
| WO | WO-2022256855 | A1 * | 12/2022 | E05B 27/0042 |
| WO | WO-2023041516 | A1 * | 3/2023 | E05B 19/0023 |

OTHER PUBLICATIONS

Written Opinion for Application No. PCT/EP2023/055031, dated May 30, 2023, 4 pages.

* cited by examiner

KEY ELEMENT, LOCK CYLINDER, LOCKING SYSTEM, AND METHOD

CROSS-REFERENCE TO RELATED APPLICATIONS

This application is a 35 U.S.C. § 371 National Stage patent application of PCT/EP2023/055031, filed on 28 Feb. 2023, which claims the benefit of Swiss patent application 000446/2022, filed on 14 Apr. 2022, the disclosures of which are incorporated herein by reference in their entirety.

TECHNICAL FIELD

The disclosure relates to the field of mechanical locking systems. It relates in particular to a locking system with a locking cylinder and a matching key element, as well as a key element, a locking cylinder for such a locking system and a method for producing a key element.

In this text, the term "key element" refers to mechanical keys and key blanks for producing such keys.

BACKGROUND

Locking cylinders have a stator (sometimes called a "cylinder housing") non-rotatably fastened to a lock and a rotor (sometimes called a "cylinder core") rotatable about the axis of the locking cylinder when a matching key is inserted. The rotation of the rotor moves output means, which are used to actuate a bolt or other means associated with the desired function of the locking cylinder.

Many mechanical locking cylinders have tumbler/counter-tumbler pairs which sense the mechanical coding of the inserted key. Of each such pair, one tumbler is guided in a hole in the rotor, and a hole in the stator aligned therewith in a base position guides the corresponding counter-tumbler. The tumbler/counter-tumbler pair is pressed radially inwards by a spring such that the tumbler protrudes into the key channel. When a key matching the locking cylinder is pushed into the locking cylinder, the tumblers are positioned such that a separating joint formed between the tumbler and counter-tumbler (i.e. generally the separating surface, separating line or separating point) coincides with a separating joint (i.e. the separating surface/shearing surface) between the rotor and stator, at which point the rotor can be rotated away from the base position.

The locking systems of interest in the present context have tumbler/counter-tumbler pairs which are arranged at an angle to the flat side, with the corresponding mechanical codings being formed by blind holes on the flat side (additional mechanical codings, e.g. on the narrow side and/or in the form of a profiling, are of course not excluded). This distinguishes them from locking systems in which the tumblers are arranged parallel to the flat side and engage in a serrated control groove in the flat side via projections that are lateral in relation to the tumbler axis.

The publications WO 01/77466 and WO 2014/032191 each present a locking system in which an extended tumbler/counter-tumbler pair is arranged in the locking cylinder at a rearmost coding position, such that the key can only be fully inserted into the locking cylinder if there is a groove of sufficient depth and with a cross-section suitable for the corresponding tumbler along a flat side of the key, away from the key tip. This approach creates an additional security feature, and the number of possible permutations-which should always be as high as possible—is simultaneously increased or at least not reduced compared to the prior art.

U.S. Pat. No. 5,819,566 discloses a cylinder lock provided with a resiliently biased auxiliary locking pin protruding into the key channel, with the auxiliary locking pin having a first end shaped to partially define an expanding pin and a second end engaging into a locking recess in the lock housing. The cooperating key has a key shank with a longitudinal slot shaped to engage into the first end of the auxiliary locking pin, with the depth profile of the slot increasing from an initial engagement depth to a functional depth. When the key is inserted, an axial force is generated which acts on the head of the auxiliary locking pin to retract the second end of the bolt from the shell locking recess.

SUMMARY

There is a constant need in locking technology to further increase copy protection without requiring too much space on the key for new security features and without significantly complicating the series production of key blanks and keys. It is therefore an object of the present disclosure to provide a key element, a locking cylinder and a locking system as well as a method for producing a key element which meet this need and which in particular enable increased copy protection.

According to one aspect of the disclosure, the disclosure relates to a key element with a key shank with two parallel flat sides and two opposing narrow sides, i.e. a flat key or a blank for producing a flat key. The key element has an inlet groove extending in one of the flat sides from the key tip parallel to the key axis which has a non-constant depth along its axial extent. The inlet groove can have a first depth, in particular in an entry region, and a second, greater depth in a coding region remote from the key tip.

According to the present disclosure, the inlet groove is undercut.

Due to its design, the inlet groove is generally profiled in cross-section perpendicular to the key axis, i.e. the depth of the groove is not necessarily constant across its width. The depth of the inlet groove at a specific axial position is therefore defined as the average depth across the cross-section at that axial location. The non-constant depth characteristic applies to the depth according to this definition. In addition, it can also apply in particular to the undercut as such.

The inlet groove runs parallel to the key axis, i.e. its (middle) position in the direction parallel to the plane of the flat side and perpendicular to the key axis (y coordinate) is constant along its axial extent. This is necessary because the block tumbler meets the flat side perpendicularly or at another angle and is not, for example, guided parallel to the flat side, as is the case with tumblers that interact with serrated control grooves. The fact that the position in the plane of the flat side (the y position) is constant does not exclude the possibility that the cross-section of the inlet groove can change along its length, which also includes the possibility that it widens or narrows along its length. An example of widening towards the rear is explained below.

On the locking cylinder associated with the key element, in particular at a rearmost position in a row of tumbler/counter-tumbler pairs, there is a block tumbler whose total length (possibly depending on the coding) exceeds the total length of the other, regular tumbler/counter-tumbler pairs, such that a key can only be fully inserted into the locking cylinder if it has the inlet groove at a sufficient depth.

The block tumbler can in particular have a sensing head which widens radially outwards proceeding from a neck such that the undercut of the inlet groove is sensed. If there is a groove of suitable width but it does not have an undercut, the key cannot be fully inserted.

Like regular tumblers, the block tumbler can also be designed to be cylindrically symmetrical (rotationally symmetrical with respect to rotation through any angle) around a pin axis.

"Undercut" is defined with respect to a direction corresponding to the direction of the pin axis which senses the key at the location of the inlet groove. This can be perpendicular to the flat side, or at an angle to the normal to the flat side. Even if the sensing pin (namely the block tumbler) does not belong to the key but to the locking cylinder, the orientation of the pin axis is defined and recognisable on the key element in that the inlet groove is symmetrical over at least part of its cross-section with respect to a central plane which is parallel to the key axis and passes through the pin axis.

In other words, the undercut is in particular an undercut with respect to the direction which is perpendicular to the key axis and which is parallel to the central plane of the inlet groove. This direction generally corresponds to the direction of the pin axis, which means that a pin with an expanded portion engaging in the undercut (e.g. the sensing head described below) would be prevented by the undercut from hypothetically being pulled radially outwards.

The undercut can be formed on both sides of the inlet groove or optionally only on one side. In addition or as an alternative, it may also exist on at least one side in directions perpendicular to the flat side; this is an option even if the central plane of the inlet groove is not perpendicular to the flat side. The feature that the undercut also exists in directions perpendicular to the flat side is generally self-evident in the approaches described in this text. It has the advantage that a region of the inlet groove is, so to speak, in the shadow for an optical scanner, i.e. an optical scanner cannot sense the inlet groove.

If a groove is undercut, at least one lateral cut is created laterally; in exemplary embodiments of the disclosure discussed here, in particular two cuts that are arranged symmetrically with respect to the central plane of the inlet groove.

The configuration of the inlet groove as a groove with an undercut brings significant advantages. Firstly, such an undercut cannot readily be detected quantitatively correctly with conventional sensing tools or conventional optical scanners used by key copiers. This alone makes copying more difficult. Secondly, to produce the undercut, specially configured tools must also be provided, e.g. milling cutters, which produce oblique grooves to form the lateral cuts at an angle to each other and to the central plane. Even though such oblique grooves can be produced efficiently once the tool is configured and do not significantly increase the manufacturing costs of key blanks, they still have to be specially configured for this purpose, which unauthorised key copiers generally lack the means to do. Thirdly, the undercut inlet groove potentially offers double security: on the one hand, as mentioned, a widened sensing head can prevent a key from being fully inserted without an otherwise equally dimensioned groove but without the undercut. On the other hand, an optional shoulder on the block tumbler, which may be present depending on the system or coding, can prevent the protection from being circumvented by a groove that is milled too wide and whose width corresponds to or exceeds the width of the sensing head. Such a shoulder can therefore cause a sensing of the web which is formed above the undercut by abutting on the flat side of the key element. According to the terminology used here, abutment on the flat side also occurs when the key element has a shallow depression next to the inlet groove and the shoulder in the region of this depression abuts on the surface of the key shank.

If at least the lateral cuts of the inlet groove in the coding region remote from the key tip are deeper than in the entry region, this enables a dual function of the block tumbler. In addition to the insertion lock, which is caused by a missing or poorly configured (without undercut) inlet groove in the entry region, an individual mechanical coding can also be sensed in the coding region. It may in particular be that the inlet groove on the blank has a central web. When customising the key in the coding region, this can be left completely, or partially or completely removed, even to such an extent that a pronounced depression is formed in the middle of the inlet groove that is deeper than the undercut. Since the inlet groove is deeper in the region of the undercut than in the—generally shallow-entry region, codings of different depths can be sensed by means of suitable shapes of the sensing head, without the undercut together with the sensing head engaging therein preventing such sensing of different depths.

It is also possible for the inlet groove to have a first depth in the entry region, a second, greater depth in an intermediate region and a third depth in an end region, with the third depth being able to correspond to the first depth or possibly (depending on the coding) the second depth, or which lies between the first and the second depth. There is also the possibility that the third depth is greater than the second depth. Depending on the configuration of the cylinder, the intermediate region and/or the end region can serve as the coding region sensed by the block tumbler. For example, with a reversible key, the intermediate region can be sensed on one side of the key and the end region on the other side. If only one of these regions is sensed, it is not immediately clear to the unauthorised key copier which region is being sensed, so they must still try to copy the entire inlet groove exactly.

In addition, by selecting different forms of block tumbler at its radially inner end, sensing can take place at different parts in or near the coding region of the inlet groove: Firstly, there is the conventional possibility of sensing the depth of the inlet groove at its bottom—i.e. in the middle—by means of an appropriately configured tip of the block tumbler. Secondly, it is possible to sense a lateral flank of the inlet groove by making the sensing head relatively wide and flattened radially inwards because it can be relatively wide due to the undercut. Thirdly, the previously mentioned shoulder of the block tumbler, which interacts with the web above the undercut, can also sense a mechanical coding by either abutting on the web or not abutting on it, depending on the depth of the inlet groove in the coding region. It is not possible to discern from the key itself what type of sensing is being carried out by the locking cylinder. This makes it more difficult for an unauthorised key copier to copy a key successfully, as they can only copy a key successfully if they adopt all the features of the copied key, including the shape and size of the undercut, which is difficult to copy.

The inlet groove can have a smaller width in the entry region than in the coding region. This has the potential advantage that the block tumbler senses the undercut in the entry region using the sensing head mentioned, i.e. that even if the undercut is missing, an insertion lock is created in the entry region, even if the configuration of the inlet groove further back, in the coding region, allows sensing of different coding depths due to its larger width.

The side walls of the inlet groove can in particular have an undercut part in the form of a part which is inclined in section perpendicular to the key axis to the central plane, namely at an acute angle (a) away from the central plane, thus forming the undercut. The acute angle can thereby be, for example, between 10° and 45°, in particular between 15° and 30°, for example between 20° and 25°, which enables production by means of milled oblique grooves.

An outer bottom part can adjoin towards the inside, i.e. in the direction away from the flat side in which the inlet groove runs, and is inclined towards the central plane, also at a (second) acute angle β. The angle between the undercut part and the outer bottom part can be a right angle, which is why the second acute angle can be $\beta=90°-\alpha$.

The inlet groove can in particular comprise an axially extending oblique groove on each of the two sides, which extend away from each other from the flat side in a section perpendicular to the key axis. The undercut part mentioned can then be formed by a side wall of the corresponding oblique groove, the outer bottom part by its base.

Above the undercut part, i.e. towards the flat side, an outer vertical part can adjoin the undercut part, at least in one side wall. The outer vertical part is a part that is approximately parallel to the central plane of the inlet groove, i.e. parallel or possibly tapering very slightly (maximum 10° or maximum 5°) towards the central plane.

In the middle, the inlet groove has a bottom part which is perpendicular to the central plane. The depth of the inlet groove in the bottom part of the finished key depends on the individual coding in the coding region. On the key blank, the inlet groove in the region of the bottom part is less deep than in the region of the lateral oblique grooves, i.e. there is a central web between the lateral oblique grooves. Depending on the coding chosen, this may, or may not, still be present on the key, possibly with a reduced height.

The inlet groove will generally be symmetrical with respect to the central plane in at least one region of its cross-section, which is complemented by the rotationally symmetrical configuration of the block tumbler around the pin axis. However, depending on the system chosen, it can be provided that the pin axis and thus also the central plane of the inlet groove is not perpendicular to the flat side. Then the symmetry of the inlet groove with respect to its central plane is not complete, but it only applies from a certain depth, because one side wall will then generally be higher than the other. This also occurs if, for example, in a central plane of the inlet groove that is perpendicular to the flat side, a shallow depression is provided on one side of the inlet groove, which may serve other purposes.

The block code groove can be symmetrical with respect to the central plane, in particular from the outer bottom part. This means that at least the outer bottom part and all parts lying deeper than this can be symmetrical with respect to the central plane.

The key element is a reversible key element, i.e. at least the region relevant for interaction with the locking cylinder, namely at least the key shank, is symmetrical with respect to a rotation of 180° around the key axis.

The key element can have an inlet ramp on the front side, towards the tip, which extends below the central plane, i.e. the inlet ramp has a depth which is greater than half the thickness of the key shank. This allows the use of tumblers that protrude relatively deep into the key channel, and correspondingly deep coding holes are possible, which has a positive effect on the number of possible different permutations. If the key is a reversible key, such an inlet ramp is not possible over the entire width of the key tip for geometric reasons.

In embodiments, the inlet ramp, the depth of which is greater than half the thickness of the key shank, is present at least at the lateral position (y position) at which the row of tumblers is located, which also includes the block tumbler.

However, the lateral position of the inlet groove can also be where the inlet ramp does not have a depth greater than half the depth of the key shank. Due to the symmetry of a reversible key, the inlet ramp can only have a depth on one lateral side (e.g. only on the left or only on the right) that is greater than half the thickness of the key shank. The inlet ramp can also extend to the other side, where it has a depth correspondingly less than half the thickness of the key shank. In such embodiments, as an alternative to the arrangement where the inlet ramp is deeper than half the thickness of the key shank, the inlet groove can also be on the lateral side where the inlet ramp is less deep than half the thickness of the key shank. Of course, it is not excluded that an inlet groove of the type described here is arranged on both lateral sides.

It is also possible to configure the key such that the inlet ramp is no deeper than half the thickness of the key shank.

In addition to the key element (key, in particular flat reversible key, or blank), a locking cylinder with the corresponding block tumbler is also part of the subject matter of the present disclosure. The locking cylinder is configured to interact with a flat key of the type described in this text, in particular a flat key with at least two rows of coding holes parallel to the key axis. At least one of the rows of coding holes is collinear with the inlet groove, i.e. it comprises coding holes arranged in the continuation of the inlet groove towards the rear, with optionally one or a plurality of the coding holes also being able to be arranged in the inlet groove itself.

As is known per se, the locking cylinder has a locking cylinder stator and a locking cylinder rotor with a key channel arranged in the locking cylinder stator and rotatable in a release position relative thereto, as well as at least one row of tumbler/counter-tumbler pairs which are slidably mounted in pin holes in the locking cylinder rotor and in the locking cylinder stator and are pressed inwards in the direction of the key channel by a spring. In addition, the locking cylinder has the block tumbler and the associated block counter-tumbler in a row with at least one other of the tumbler/counter-tumbler pairs, for example in the rearmost position in the locking cylinder. The block tumbler has a neck radially inwards towards the key channel and a sensing head adjoining thereto radially inwards, with the sensing head having a larger diameter than the neck and being designed to engage into the undercut inlet groove.

The total lengths of the block tumbler/counter-tumbler pair are greater than the lengths of the other (regular) tumbler/counter-tumbler pairs, resulting in the insertion lock described in this text.

The locking system according to the disclosure has, in addition to at least one key element—generally a plurality of keys and/or blanks—at least one locking cylinder. In addition to locking cylinders with the specially shaped block tumbler with neck and widened sensing head, a locking system can also have locking cylinders which do not have such a block tumbler, but rather a block tumbler with a conventional geometry tapering radially inwards or no block tumbler at all.

The possible features of the key element described in this text are optionally also features of the locking system and—mirrored accordingly—of the locking cylinder, and vice versa.

A method for producing a key element proceeds in particular as follows: In a first step, a key moulded body is provided with a preparation groove that runs where the inlet groove is to be created and that extends axially rearwardly along the flat side from the key tip. Then, proceeding from the preparation groove, an axially extending oblique groove is introduced, e.g. milled, on both sides, with the oblique grooves being inclined at the (first) acute angle α discussed above away from the central plane of the preparation groove. At least the oblique grooves and, for example, also the preparation groove are introduced such that they have a non-constant depth along their axial extent, in particular by being less deep in the entry region than in the coding region further back.

After the oblique grooves have been introduced, the inlet groove generally has a central web between the oblique grooves. In this state, the key element can serve as a key blank and be delivered to system providers, for example. In a further step, coding holes can then be drilled to form the key. Depending on the coding, this step can, for example, also include drilling a coding hole in the coding region of the inlet groove. In parallel to the drilling of the coding holes, the inlet groove can also be further processed, e.g. in the entry region, for example by partially or completely removing the central web.

In this text, the orientation terms “radially”, “radially inwards”, “axially” etc. generally refer, unless otherwise stated, to the key axis, which in the locking system also corresponds to the locking cylinder axis when the key is inserted. “Front” refers to the position on the key or blank towards the key tip, and “back” is a position towards the key head. In the locking cylinder, “front” is the position towards the insertion opening and “back” is the opposite, i.e. when the key is fully inserted, a front position on the key corresponds to a rear position in the locking cylinder. When describing the inlet groove or coding holes in the key element, the terms “top” or “bottom” are sometimes used in this text. This refers to the situation, which is also represented in the figures, in which the groove or hole extends from the upper flat side into the depth.

With reference to the inlet groove, the “length” of the inlet groove refers to its extent in the axial direction (or in the ‘x’ direction). The “depth” is the extent perpendicular to the flat side of the key (extent in the ‘z’ direction), and the “width” is the extent in the direction perpendicular to the key axis and parallel to the flat side (extent in the ‘y’ direction).

BRIEF DESCRIPTION OF THE DRAWINGS

The subject matter of the disclosure will be explained in more detail below on the basis of exemplary embodiments and the accompanying drawings. In the drawings, identical reference numerals denote identical or analogous elements. They show.

DETAILED DESCRIPTION OF THE DRAWINGS

Figure 1:
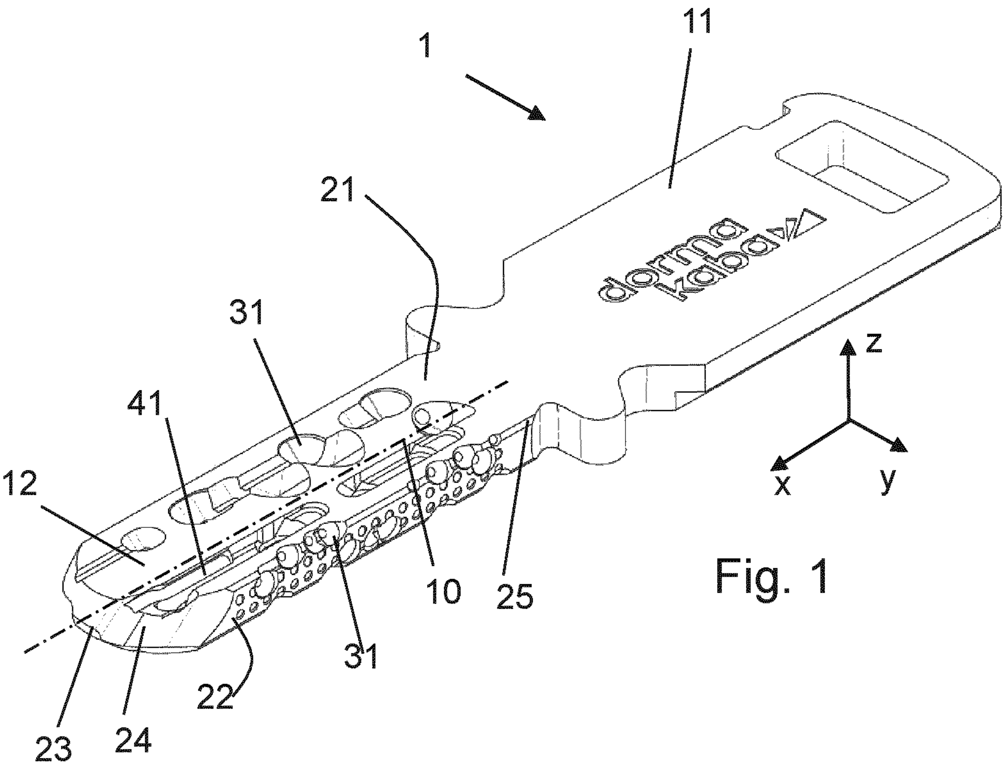
FIG. 1 a perspective view of a key.

FIG. 1 shows an example of a key 1 with key head 11 and key shank 12. The key 1 is a flat key in which the key shank is substantially non-square rectangular in cross-section perpendicular to a key axis 10, thereby defining two parallel flat sides 21 and two narrow sides 22 with a smaller area than the flat sides 21. An edge 25 is formed between the flat sides 21 and the narrow sides 22. In the example represented, the narrow sides 22 are not completely flat, but slightly rounded.

FIG. 1 also shows the Cartesian coordinate system used in this text, with the x direction running parallel to the key axis and the z direction perpendicular to the flat sides 21.

On the key shank 12, rows of coding holes 31 of various shapes and configurations are provided, running parallel to the key axis 10.

The key shown is a reversible key, i.e. the key shank is symmetrical with respect to a rotation of 180° around the key axis 10, and the codings on the front and rear flat sides 21 are correspondingly identical.

Towards the key tip 23, the key has an inlet ramp 24 which slopes forwards at an angle, which enables the locking cylinder to have pins (e.g. tumblers) which sense the coding holes and which protrude further into the key channel than to the central plane, such that the coding holes can potentially have a depth greater than half the thickness of the key. This has a positive effect on the number of possible permutations.

Figure 2:
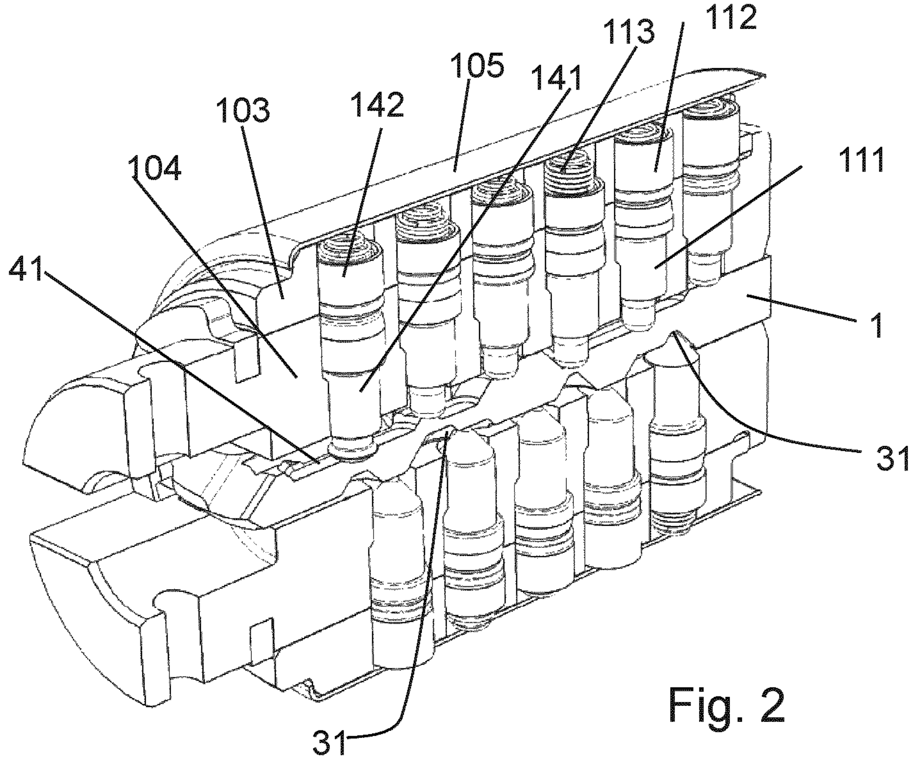
FIG. 2 a perspective view of a locking cylinder with key, represented in section.

FIG. 2 shows the key 1 with a locking cylinder 101. The locking cylinder 101 has, in a manner known per se, a stator 103 and a rotor 104 mounted therein. On the rotor 104 is formed a key channel 105, into which the shaft of the key 1 is inserted. FIG. 2 shows the configuration with the key fully inserted. If the key is coded appropriately, the rotor 104 can be rotated relative to the stator 103 about a locking cylinder axis parallel to the key axis. The rotation drives a bolt or other element, which is not shown in FIG. 2.

The coding of the locking cylinder is achieved by the fact that pins serving as tumblers 111 with different tumbler lengths depending on the coding are mounted in the rotor

104, with corresponding spring-loaded counter-tumblers 112 being present in the stator 103 (springs 113). These press the tumblers radially inwards against a stop. By inserting the key they are lifted against the spring force. If the key is coded appropriately, as is the case in FIG. 2, the separating joint (i.e. the separating surface) between each tumbler 111 and its counter-tumbler 112 coincides with a separating surface between rotor 104 and stator 103, which is why the rotor can be rotated away from the position shown in FIG. 2. Also illustrated in FIG. 2 is, firstly, the principle that the radially inner ends of the tumblers can be different in order to also sense the shape of the coding holes 31 in the key, and, secondly, the principle that, with one exception discussed below, the sum of the lengths of the tumbler and counter-tumbler is identical for all pairs (or at least for groups of pairs).

These principles of a locking cylinder design and interaction with a key that are known per se are supplemented according to the disclosure by the inlet groove 41 on the key and the block tumbler 141 and the corresponding block counter-tumbler 142, which in total can have a greater length than the regular tumbler/counter-tumbler pairs, on the locking cylinder 101.

Figure 3:
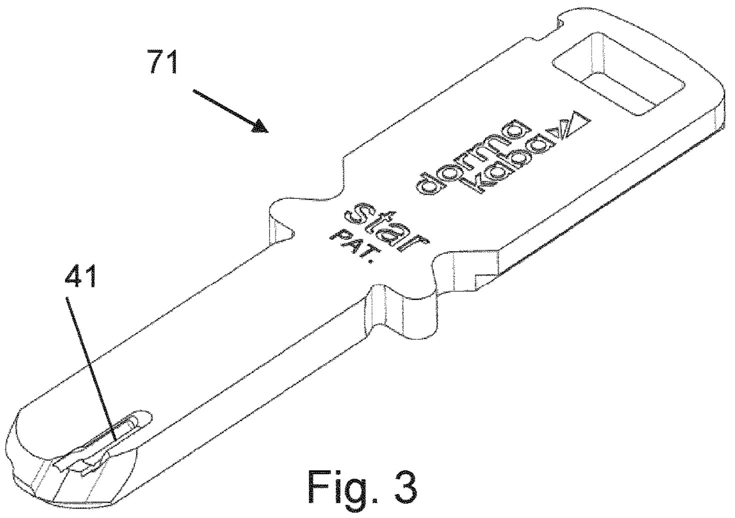
FIG. 3 a perspective view of a key blank for producing a key according to FIG. 1.
Figure 4:
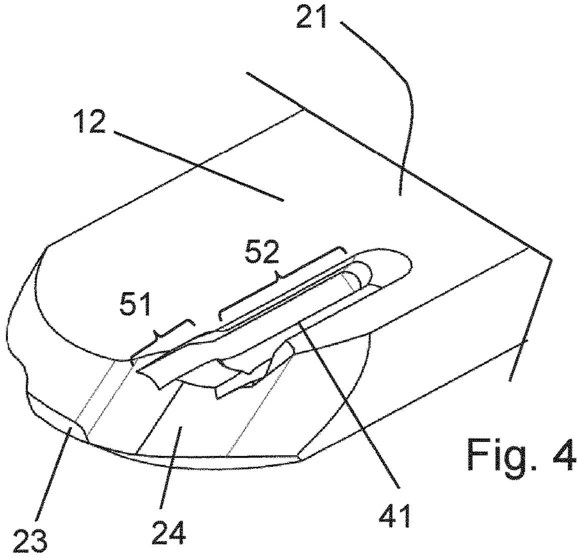
FIG. 4 a detail of the view from FIG. 3.

FIG. 3 shows a key blank 71 as it can be used for the production of a key according to FIG. 1. The undercut inlet groove 41 is present on the key blank, while the coding holes are only drilled on the key and can thus be used for customisation. The key can also have customised features in the region of the inlet groove 41 itself, which will be described below.

The inlet groove extends along the flat side 21 from the key tip 23 in the axial direction. In FIG. 3, it can firstly be seen that it is undercut and secondly that it has a non-constant depth in that along its axial extent it first runs at a higher level in an entry region 51 and has a first, smaller depth, and then runs lowered to a lower level in a coding region 52 and has a second, greater depth.

Figure 5:
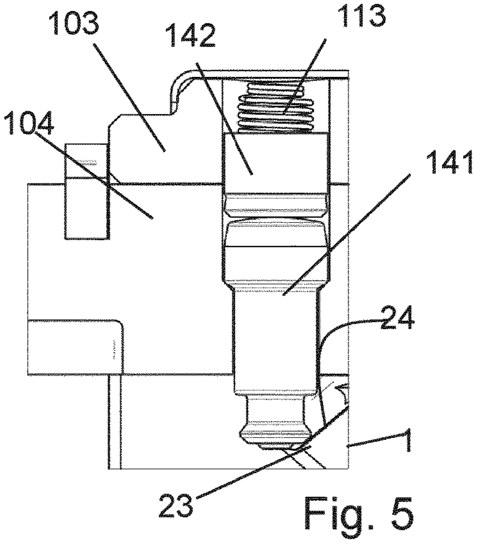
FIG. 5-8 the view of the block tumbler and the block counter-tumbler during four different phases when inserting the key into the locking cylinder, with the key and locking cylinder drawn in section.

FIGS. 5-8 show the block tumbler 141 with block counter-tumbler 142 and spring 133 arranged at a rearmost position in the locking cylinder while the key 1 is inserted, with four different key positions being represented. FIG. 5 represents how the key tip 23 hits the radially inner end of the block tumbler 141, whereupon the block tumbler 141 is raised by the inlet ramp 24 and pushed radially outwards against the spring force when the key is inserted further.

Figure 6:
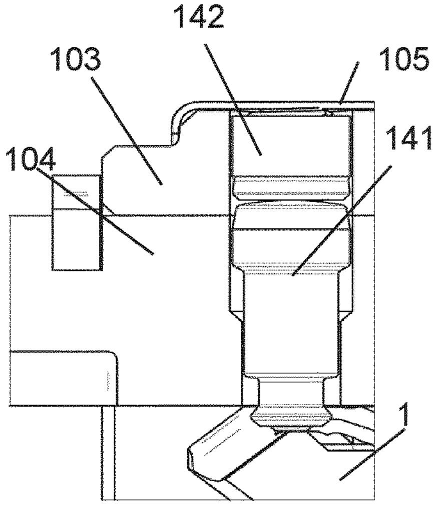

FIG. 6 shows the situation at the time when the block tumbler is in the entry region. The block tumbler 141 is raised so far that the block counter-tumbler 142 almost or completely abuts the sleeve 105 which surrounds the locking cylinder stator 103 and on which the spring 103 rests. If the key did not have the inlet groove or the undercut, the key would not be able to reach this position and would be blocked. This is because the sum of the radial lengths of the block tumbler 141 and the block counter-tumbler 142 is greater than the corresponding sum of the lengths of the regular tumblers 111 and counter-tumblers 112, which can also be seen in FIG. 2, for example.

Figure 7:
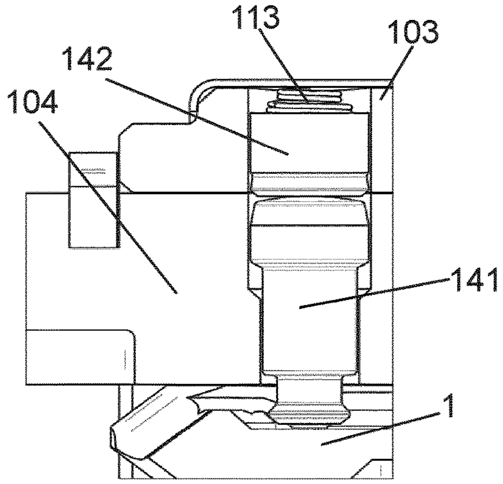

In FIG. 7, it can be seen that the block tumbler is again slightly deflected radially inwards by further inserting the key, as the inlet groove is lowered to the lower level.

Figure 8:
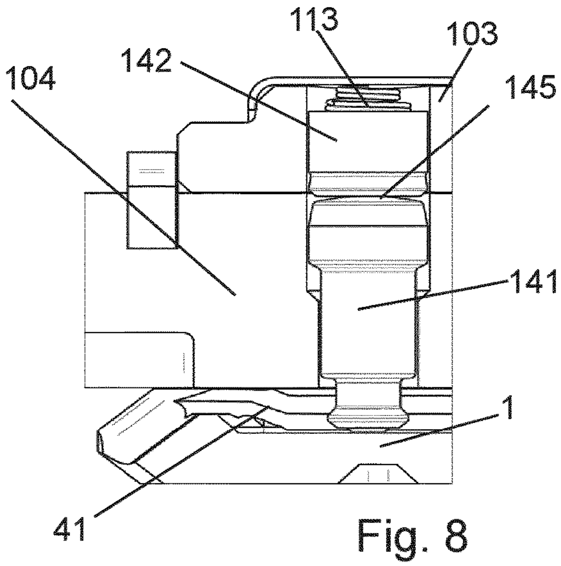

FIG. 8 shows the situation when the key 1 is fully inserted and the block tumbler 141 is in a coding position (a position in the coding region) relative to the key. As with the regular tumblers and counter-tumblers, with a suitable key the separating joint 145 will be aligned with the separating surface between the locking cylinder stator 103 and the locking cylinder rotor 104.

Figure 9:
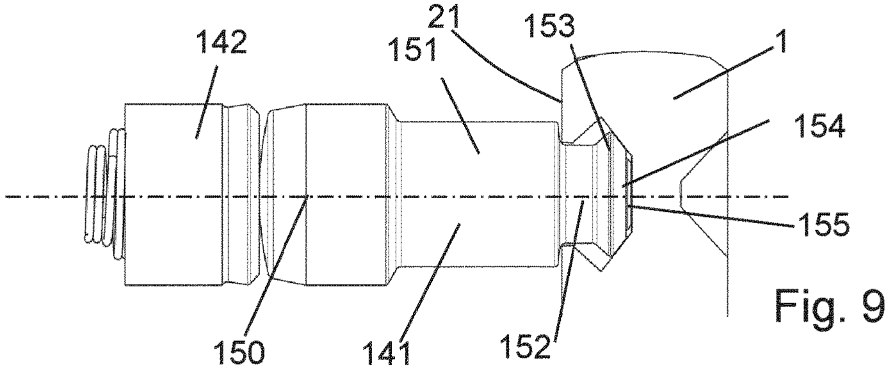
FIG. 9-11 the view of the block tumbler and the block counter-tumbler together with a detail of the key—represented in section along a plane perpendicular to the key axis—with different configurations of the block groove in the coding region.

FIG. 9 shows an embodiment of the block tumbler 141. Towards the radially inner end, it has a neck 152 adjoining a shaft 151 and a sensing head 153 adjoined thereto which has a larger diameter than the neck 152 and can engage in the undercut. The sensing head forms a tapering region 154 towards the radially inner end and, in the embodiment represented, has a flat radially inner projection 155 which forms the tip of the block tumbler.

Figure 10:
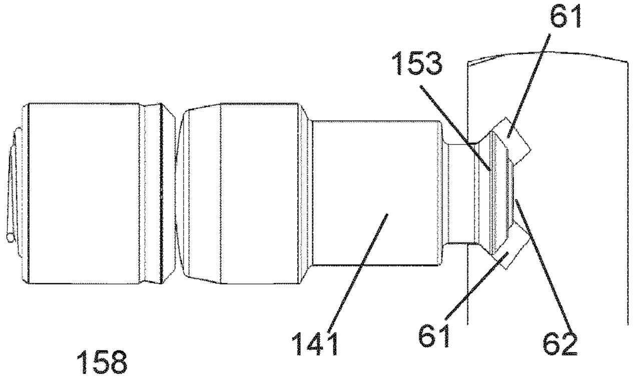

At the coding position, independent of the function of the insertion lock, which is caused by the total length of block tumbler 141 and block counter-tumbler 142, various key-dependent codings are also possible. FIG. 9 and FIG. 10 show two corresponding variants.

In the coding according to FIG. 9, the inlet groove in the coding region and in particular at the coding position is configured such that a depression is formed in the middle into which the sensing head 153 engages. The block tumbler can thereby abut at its tip on the bottom of the inlet groove and/or, with the tapering region 154, on a flank of the groove.

However, it can also be provided that the inlet groove in the coding region is milled less deeply, such that a central web 62 remains between the lateral oblique grooves 61 forming the undercut, on which the tip of the sensing head 153 rests, as can be seen in FIG. 10. Different heights of this central web up to the situation according to FIG. 9 (no central web can be seen at all) form different mechanical codings to which the length of the block tumbler 141 is adapted in each case, which is also shown below in FIG. 19.

The pin axis 150 is also shown in FIG. 9. The block tumbler 141 and the block counter-tumbler, for example, are rotationally symmetrical (cylindrically symmetrical) with respect to this axis, just like the regular tumblers and counter-tumblers. Even if the block tumbler 141 does not belong to the key but to the locking cylinder, the alignment of the pin axis 150 is defined and recognisable on the key (and on the blank). The inlet groove defines the direction of the pin axis as a direction in the plane perpendicular to the key axis (the y-z plane) and also in the plane with respect to which the inlet groove is at least partially symmetrical. The direction of the pin axis will generally be perpendicular to the bottom of the inlet groove in the region of its centre and/or exactly in the middle between flanks of the inlet groove and/or in the middle between oblique grooves 61 of the type described and/or in the middle between the undercut on both sides.

In the exemplary embodiment of FIG. 9, as in FIG. 10 and FIG. 11 described below, the pin axis 150 is perpendicular to the flat side 21.

Figure 11:
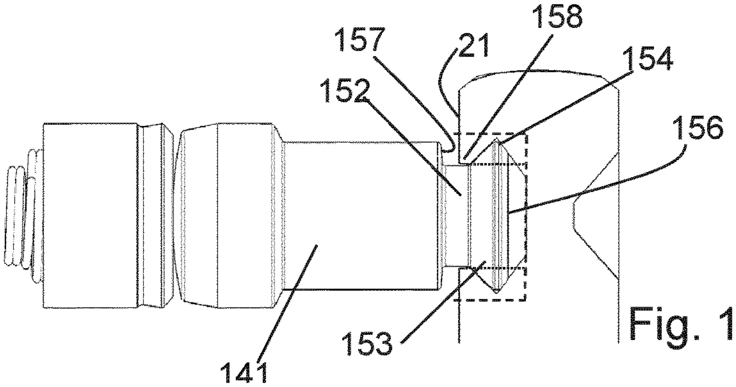

FIG. 11 illustrates the possibility of adapting the shape of the sensing head 153. The sensing head 153 is flattened at the radially inner end such that the tapering region 154 is shortened, the radially inner projection is also absent and an enlarged end surface 156 is accordingly obtained. The sensing is therefore carried out laterally through the tapering region 154, outside the region which can be covered by a scanning tool which senses the key shank from the flat side in order to copy the key (see the dotted line in FIG. 11).

If someone attempts to copy the key using conventional milling tools and in doing so mills the inlet groove over its entire width to accommodate the width of the sensing head 153, as indicated by the dashed line in FIG. 11, then this will result in failure because the block tumbler will extend too far radially inwards until the end surface 156 abuts against the bottom of the overly wide milled groove, which would result in negative locking in the configuration represented. It is not possible to discern from the key to what other depth such a wide groove would have to be milled in order to successfully unbolt the locking cylinder.

The combination of a sensing head configured as shown in FIG. 11 with the undercut of the inlet groove 41 is therefore an additional security feature and represents copy protection.

Other options include:

Variations of the length of the neck 152. A shortened neck 152 can cause the block tumbler to already stand with the shoulder 157 between the shaft 151 and the neck 152 in the region of the web 158 above the undercut on the flat side 21 of the key shank. If the groove is milled too wide by the unauthorised copier to accommodate the sensing head without providing an undercut, such standing-up cannot take place and the block tumbler also moves too far radially inwards, which will cause a negative locking.

Combinations are also conceivable. Overall, there are a number of possibilities where the inlet groove or its surroundings can be sensed, and it is not clear from the key itself where the block tumbler effectively does this. Therefore, a key cannot be reliably copied by copying only individual features of it.

Figure 12:
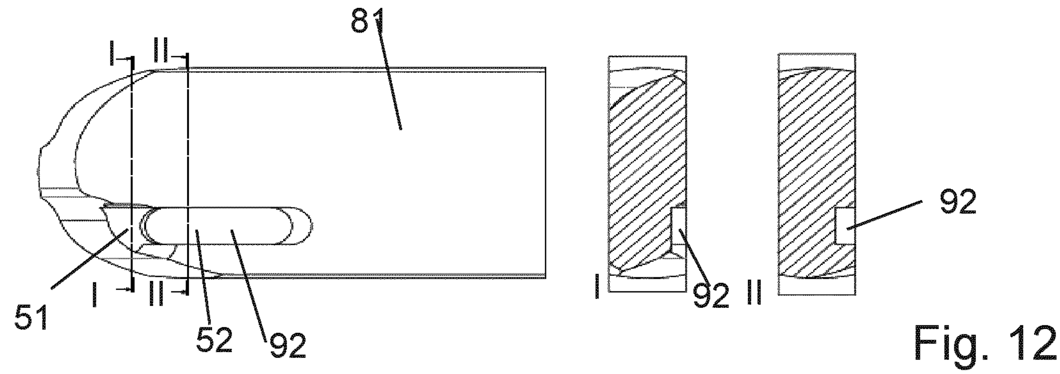
FIG. 12-14 a view and sectional representations of a key element during three phases of production.
Figure 13:
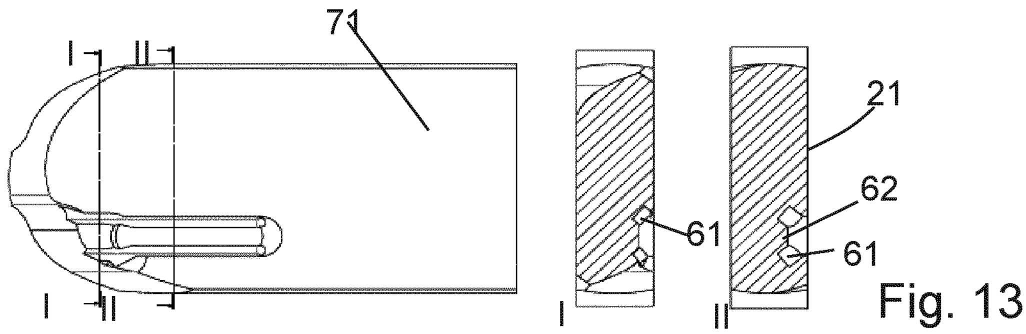
Figure 14:
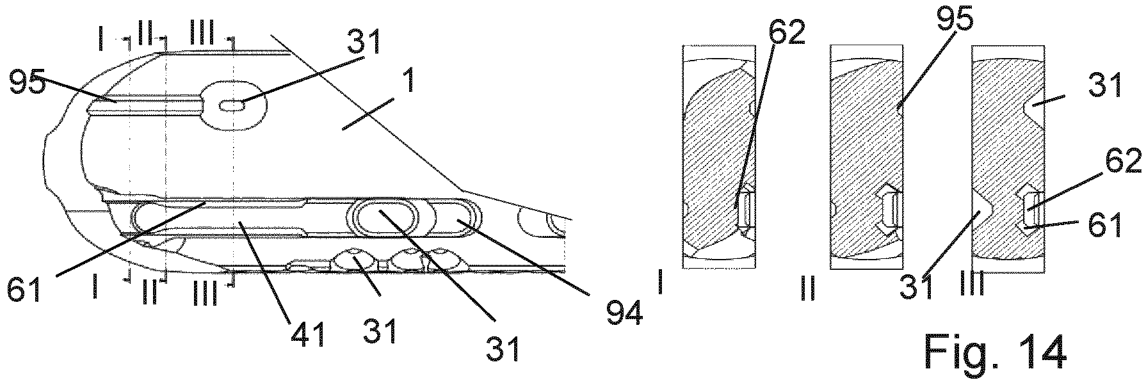

FIGS. 12 to 14 show steps in the process of making a key. In the figures, sections through the planes I-I, II-II and III-III are represented on the right, which are shown in the plan views on the left in the figures.

In a step represented in FIG. 12, a key moulded body 81 is first provided with a preparation groove 91 which runs axially along the flat side of the key tip in the region in which the inlet groove is to be formed. The preparation groove 91 can already have a smaller depth in the entry region 51 than in the coding region 52. It serves to prepare and simplify the creation of the undercut inlet groove.

FIG. 13 shows the blank 71 as it was created after the inlet groove was created. By milling with a milling tool whose rotation axis is inclined towards the flat side, in addition to the preparation groove and proceeding from this, the oblique grooves 61 are created, between which a central web 62 remains. It can also be clearly seen in FIG. 13 that the inlet groove 41 thus created runs lowered towards the rear, towards the coding region, i.e. is deeper, both in the region of the central web and, particularly pronounced in the embodiment of FIG. 13, in the region of the oblique grooves 61.

In the state represented in FIG. 13, the blank is finished. In this state, it can, for example, be sold as a product to specialist shops that are authorised to customise it.

The finished, customised key can be seen in detail in FIG. 14. During the customisation step, on the one hand, the coding holes 31 are drilled, of which only a few are shown in FIG. 14 and which, in addition to different depths, can also have different shapes. On the other hand, the inlet groove 41 is also modified depending on the customisation. In the example of FIG. 14, this is done by partially removing the central web 62 in the coding region 41 (see, for example, section III of FIG. 14) to the depth of a desired coding as well as by optional post-processing in the entry region (section I of FIG. 14).

FIG. 14 also shows the optional feature of a non-undercut groove extension 94 of the inlet groove, which represents a further coding. Optionally, the tumbler/counter-tumbler pair arranged in the same row adjacent to the block tumbler (or, in the case of a reversible key, the tumbler/counter-tumbler pair at the corresponding position of the locking cylinder rotated by 180°) can also be extended in order to also sense the groove extension 94 and, if necessary, to have a corresponding blocking effect. In the example represented, one of the coding holes 31 is located in the groove extension.

Another optional feature seen in FIG. 14 is another inlet groove 95 leading to a first coding position.

Figure 15:
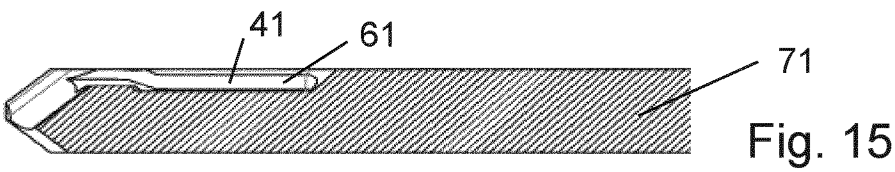
FIG. 15-16 a key blank cut along a plane parallel to the key axis, with two different embodiments of the inlet groove.
Figure 16:
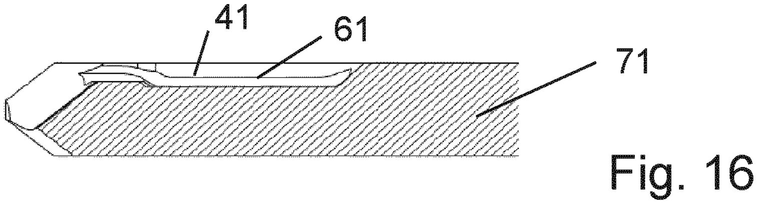

The inlet groove 41 can be coded not only by customisation (by machining the central web 62), but also by different depths of the oblique grooves 61, which is illustrated in FIGS. 15 and 16. These figures each show a blank 71 with a shallower inlet groove 41 (FIG. 15) and with a deeper inlet groove 41 (FIG. 16). In this way, for example, a distinction can be made between different incompatible locking systems at the "blank" level. For example, a locking cylinder can be configured such that a key with the flatter inlet groove cannot be inserted at all by choosing an appropriate total length of block tumbler and block counter-tumbler. On the other hand, a different locking cylinder can also be configured such that there can be no key with the deeper inlet groove that opens this locking cylinder—e.g. by a very flat coding in the region of the inlet groove (short block tumbler)—by using the interaction between the sensing head and the undercut.

Figure 17:
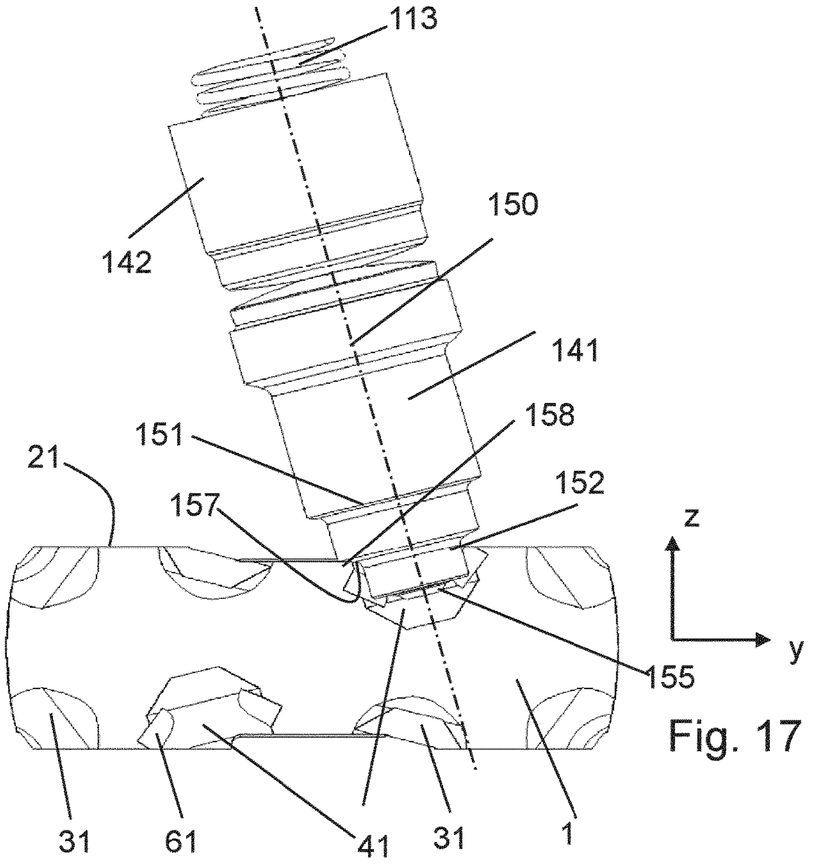
FIG. 17-18 a view of a block tumbler together with the associated key cut along a plane perpendicular to the key axis in further embodiments.

Based on the embodiment of FIG. 17, it is firstly illustrated (as in FIG. 18 below) that the pin axis 150 does not necessarily have to be perpendicular to the flat side 21. Rather, as is known per se, it can be at an angle to the normal to the flat side in the y-z plane, i.e. the plane perpendicular to the key and cylinder axis. This optionally applies to both the block tumbler 141 and the regular tumbler pins in the corresponding tumbler row. The undercut of the inlet groove also applies in these embodiments with respect to the pin axis 150. Also in these embodiments, the inlet groove can be symmetrical with respect to a plane which passes through the pin axis 150 and is parallel to the key axis, i.e. in FIG. 17 perpendicular to the drawing plane.

The option that the pin axis is at an angle other than 0° to the normal to the flat side 21 applies to all embodiments and features of the concepts described in this text. It is independent of the specific features of the embodiments of FIGS. 17 and 18.

FIG. 17 also shows the possibility of using a conventional tumbler pin without the expanded sensing head as the block tumbler pin 141. The pin tip with the radially inner projection 155 then adjoins directly to the neck 152. In such a block tumbler pin 141, the undercut is not sensed and would also work with keys that have a non-undercut inlet groove if their width is adjusted accordingly. However, in a system with a plurality of locking cylinders, it may be an option to use both cylinders with an expanded sensing head on the block tumbler and those without this sensing head.

Also illustrated in FIG. 17 is the possibility of having a shoulder 157 of the block tumbler abutting on the key surface, i.e. on the flat side 21. In corresponding embodiments, it is not the depth of the inlet groove—e.g. in the coding region—that is sensed, but only its presence.

Figure 18:
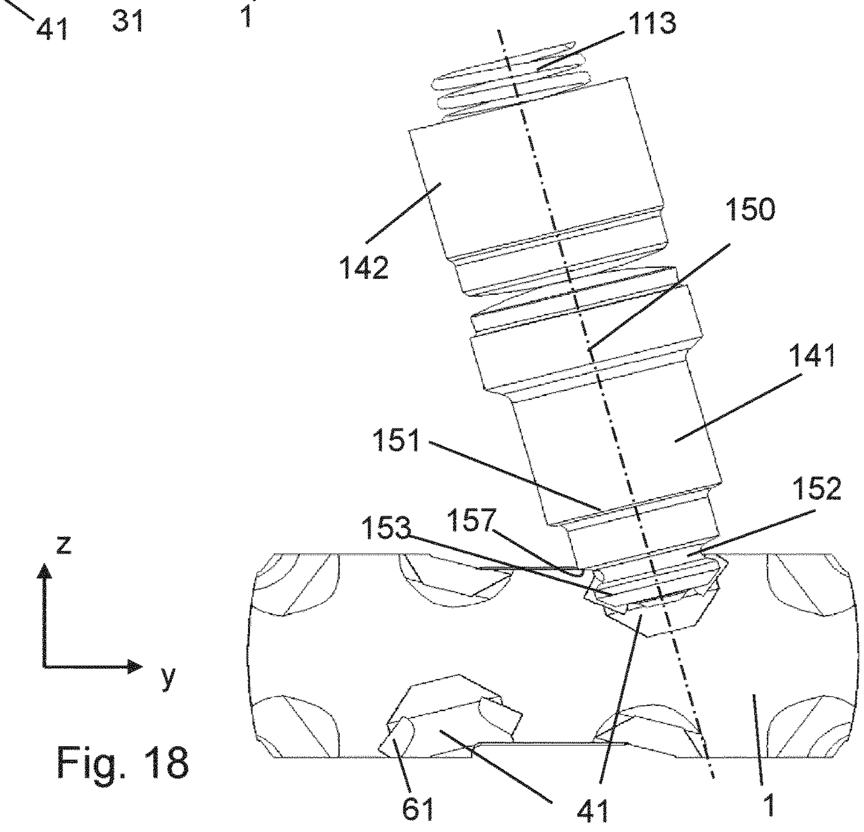

The latter (sensing only of the key surface in lock cylinder configurations) is also an option in embodiments with the expanded sensing head 153, which is represented in FIG. 18. In this embodiment, in addition to the presence of the inlet groove, the undercut is also sensed. The width of the shaft 151 in the region of the shoulder 157 can thereby be similar to the width of the sensing head. Therefore, depending on the shape and dimensions of the sensing head, a key with an inlet groove whose width is large enough to accommodate the sensing head would not work, since the block tumbler would then not be able to stand up with the shoulder 157 on the flat side and the block tumbler would fall too far radially inwards. The possibility of sensing the key surface is therefore also a potential security feature in combination with the undercut.

The block tumblers 141 of FIGS. 17 and 18 also differ in the shape of the shaft 151 from that of the embodiments described above, in particular by the steps of the shaft. However, this does not affect the other features described in this text.

Figure 19:
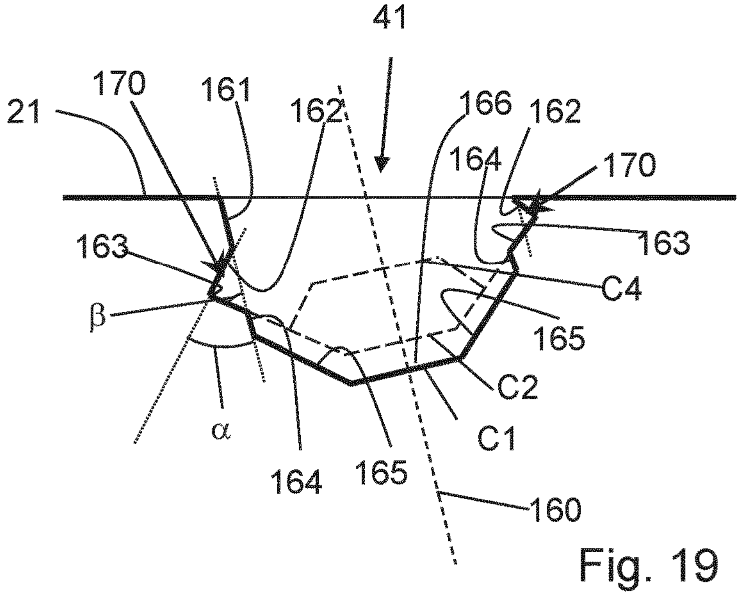
FIG. 19 a schematic cross-sectional representation of an inlet groove in the coding region.

In FIG. 19, a schematic cross-section is drawn through the inlet groove 41 in the coding region. The thick line shows the inlet groove with a specific first coding (C1), which corresponds to the longest block tumbler. In the example shown, the central plane 160 of the inlet groove—in which the pin axis of the block tumbler lies—is inclined to the normal to the flat side 21.

Characteristic of the inlet groove of keys according to the disclosure and also key blanks is an undercut part 162 which, coming from the flat side and into the depth of the inlet groove, is inclined away from the central plane, which results in the undercut. The undercut part is inclined at an acute angle $\alpha$ to the central plane 160, with the angle $\alpha$ in particular being able to be between 10° and 45°, for example between 15° and 30°.

Towards the flat side, the undercut part can adjoin an outer vertical part 161, which in the case of inlet grooves inclined to the flat side normal, as in the example shown, can also be formed on only one side, in FIG. 19 on the left side.

In the direction away from the flat side 21, the undercut part 162 is terminated by an outer bottom part 163 which is inclined towards the central plane 160, in particular at a second acute angle $\beta$. In many exemplary embodiments, the second acute angle $\beta$ is larger than the first acute angle $\alpha$. In particular, the outer bottom part 163 can be formed at a right angle to the undercut part 162. Then $\beta=90°-\alpha$. Such an outer bottom part can be easily made by using a milling tool at an angle $\alpha$ to the central plane 160, and oblique grooves are milled, as explained above with reference to FIG. 13.

Depending on the coding, an inner vertical part 164 and an inwardly-tapering part 165 may follow the outer bottom part.

The dashed lines outline alternative cross-sections that result from a second coding (C2) and a fourth coding (C4); a third coding between the second and fourth coding is not shown for reasons of clarity. It can be seen from these dashed lines that the inner vertical part 164 does not always result, and that a counter gradient can also result from the inwardly-tapering part 165.

Common to all codings is an inner bottom part 166 whose position determines the coding in embodiments in which the coding is sensed by the tip of the block tumbler. The central plane 160 passes through the inner bottom part 166 and generally forms its central-vertical plane.

In FIG. 19, reference numeral 170 designates the undercut, delimited by the respective dotted line.

In FIG. 19, it can also be seen that the inlet groove is symmetrical with respect to the central plane 160, except for the fact that the side wall is not raised the same distance on both sides due to the inclined position of the central plane (160); in other embodiments, e.g. in FIG. 17 and FIG. 18, a shallow recess next to the inlet groove can also have an influence on how far the side wall extends. If the inlet groove is symmetrical with respect to the central plane, this can mean in this text that the symmetry only exists from a certain depth, measured along the central plane.

Figure 20:
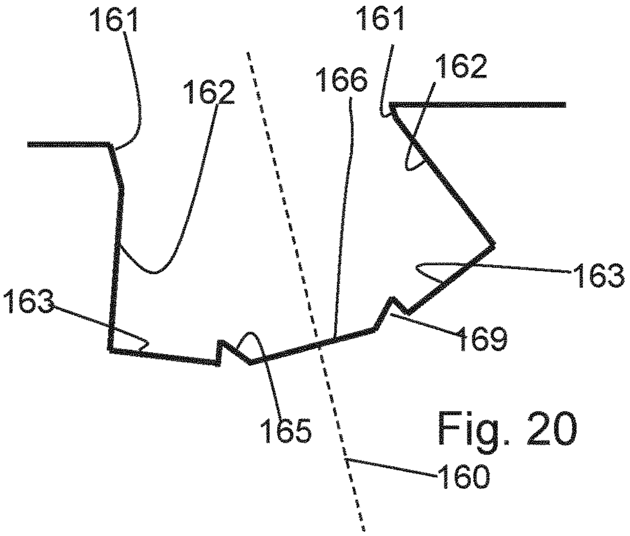
FIG. 20 a schematic cross-sectional representation analogous to FIG. 19 with a comparatively deeper inlet groove.

FIG. 20 shows a representation, analogous to FIG. 19, of a cross-section through an inlet groove 41 in the coding region. The inlet groove 41 of the embodiment of FIG. 20 differs from that of FIG. 19 in that the undercut is deeper, i.e. during production, the lateral oblique grooves were milled deeper into the key blank. This results in a qualitatively slightly different course of the side wall of the inlet groove, since even in the embodiment with the deepest, first coding there is no inner vertical part. Instead, small webs 169 may be present next to the outer bottom part 163 towards the central plane, which, due to the manufacturing process, arise between the milled portion forming the oblique grooves and the inner bottom part 166. In addition, in the embodiment represented, an outer vertical part 161 is formed on both sides, although the central plane 160 of the inlet groove is inclined to the flat side normal.

Figure 21:
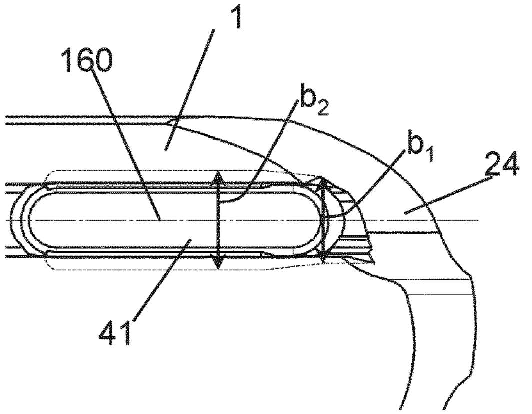
FIG. 21 a view of a tip of a key element with an inlet groove widening rearwards.
Figure 22:
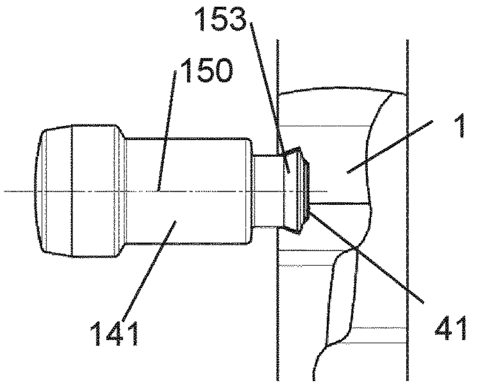
FIG. 22 a view of the key tip of the key element according to FIG. 21, together with a block tumbler which engages into the inlet groove in the entry region.

FIGS. 21 and 22 illustrate, using a key 1 represented in sectioned view, the possibility that the inlet groove 41 has a smaller width (first width $b_1$) at the front side in the entry region than in the coding region (second width $b_2$). The width of the inlet groove at a specific axial position measured at the depth at which the inlet groove is widest in the cross-section at this axial point, i.e. at the depth of the undercut. As a result, the undercut of the inlet groove 41 can already be sensed in the entry region, as the sensing head 153 would prevent insertion if the undercut were not present, which can be clearly seen in FIG. 22. FIG. 22 illustrates that the sensing head practically completely fills the undercut in the entry region because the inlet groove is less wide there. In the coding region, the larger second width $b_2$ of the inlet groove has different codings, i.e. the sensing head can be arranged at different depths relative to the parts which form the undercut.

The invention claimed is:

1. A key element having a key head and a key shank which extends along a key axis from the key head to a front key tip and has two parallel flat sides and two mutually opposing narrow sides, having an inlet groove extending from the key tip in one of the flat sides in parallel with the key axis which has a non-constant depth along its axial extent, wherein the inlet groove is undercut, wherein the key element is a reversible key element in that the key shank is symmetrical with respect to a rotation of 180° around the key axis.

2. The key element according to claim 1, wherein the inlet groove has a first depth in an entry region and a second, greater depth in a coding region remote from the key tip.

3. The key element according to claim 2, wherein an undercut formed by the inlet groove extends to a greater depth in the coding region than in the entry region.

4. The key element according to claim 2, wherein the inlet groove has a smaller width in the entry region than in the coding region.

5. The key element according to claim 1, wherein a side wall of the inlet groove has, at at least one position in a section perpendicular to the key axis, an undercut part which is inclined away from the flat side from a central plane of the inlet groove at an acute angle to the central plane, wherein the acute angle to the central plane of the inlet groove is between 10° and 45°.

6. The key element according to claim 5, wherein in the direction away from the flat side an outer bottom part adjoins the undercut part, wherein the outer bottom part is inclined at a second acute angle towards the central plane of the inlet groove, wherein the outer bottom part forms a right angle with the undercut part.

7. The key element according to claim 1, which is a key blank for producing a flat key by providing customised coding holes.

8. The key element according to one of claim 7, wherein the inlet groove has the two oblique grooves and a central web between the oblique grooves.

9. The key element according to claim 1, which is a flat key and has on the flat side at least two rows of coding holes parallel to the key axis, one row of which is arranged collinearly with the inlet groove.

10. A locking cylinder for a key element according to claim 9, with a locking cylinder stator and a locking cylinder rotor with a key channel arranged in the locking cylinder stator and rotatable in a release position relative thereto, as well as at least one row of tumbler/counter-tumbler pairs which are slidably mounted in pin holes in the locking cylinder rotor and in the locking cylinder stator and are pressed inwards in the direction of the key channel by a spring, further including a block tumbler and an associated block counter-tumbler, wherein the block tumbler has a neck radially inwards towards the key channel and a sensing head adjoining thereto radially inwards, wherein the sensing head has a larger diameter than the neck and is designed to engage into the undercut inlet groove.

11. The locking cylinder according to claim 10, wherein a sum of the lengths of the block tumbler and the block counter-tumbler is greater than a sum of the lengths of the tumbler/counter-tumbler pairs.

12. The locking cylinder according to claim 10, wherein the block tumbler is arranged at an axially rearmost position in the row of tumbler/counter-tumbler pairs.

13. A locking system, having the at least one key element and at least one locking cylinder according to claim 12, wherein the block tumbler is arranged such that when the key element is inserted into the key channel, the key channel is first raised and then the sensing head is guided in the inlet groove.

14. The locking system according to claim 13, wherein the inlet groove is designed such that the block tumbler is first raised into a first radially outer position when the key element is inserted and is then displaced radially inwards into a second position.

15. The locking system according to claim 13, wherein the sensing head is located in a coding region of the inlet groove when the key element is fully inserted into the key channel.

16. The locking system according to claim 15, wherein a radially inner tip of the sensing head rests against a bottom of the inlet groove when the sensing head is located in the coding region.

17. The locking system according to claim 15, wherein a laterally radially inwardly tapering region of the sensing head abuts against an inwardly tapering part of the inlet groove forming a lateral flank when the sensing head is located in the coding region.

18. The locking system according to claim 15, wherein a shoulder of the block tumbler formed radially outside the neck abuts the flat side of the key element when the sensing head is located in the coding region.

19. A method for producing a key element according to claim 1, the method including the following steps:

providing a key moulded body with a key shank with two parallel flat sides and two narrow sides between the flat sides, and with a key head, wherein the key moulded body forms a key tip on the front side, providing a preparation groove which extends axially rearwardly along one of the flat sides from the key tip, and providing, on both sides, an axially extending oblique groove, which extends proceeding from the preparation groove from a central plane of the preparation groove obliquely into the depth of the key shank, resulting in the inlet groove with an undercut from the preparation groove with the two oblique grooves, wherein the oblique grooves and/or the preparation groove are provided such that they have a non-constant depth, and after introducing the oblique grooves, the inlet groove has a central web between the oblique grooves.

20. The method according to claim 19, wherein coding holes are provided to create a flat key and the central web between the oblique grooves is at least partially removed.

* * * * *